United States Patent [19]
Usuki et al.

[11] Patent Number: 5,882,276
[45] Date of Patent: Mar. 16, 1999

[54] SHIFT CONTROL METHOD FOR AN AUTOMATIC TRANSMISSION

[75] Inventors: Katsutoshi Usuki; Kenjiro Fujita; Katsuhiro Hatta, all of Tokyo, Japan

[73] Assignee: Mitsubishi Jidosha Kogyo Kabushiki Kaisha, Tokyo, Japan

[21] Appl. No.: 776,932

[22] PCT Filed: Jun. 12, 1996

[86] PCT No.: PCT/JP96/01593

§ 371 Date: Feb. 11, 1997

§ 102(e) Date: Feb. 11, 1997

[87] PCT Pub. No.: WO96/41978

PCT Pub. Date: Dec. 27, 1996

[30] Foreign Application Priority Data

Jun. 13, 1995 [JP] Japan .................................. 7-146615

[51] Int. Cl.⁶ .................................................. F16H 59/48
[52] U.S. Cl. ........................... 477/120; 477/154; 701/58
[58] Field of Search ..................... 477/120, 143, 477/154, 155; 701/58, 60, 61

[56] References Cited

U.S. PATENT DOCUMENTS

| | | |
|---|---|---|
| 4,690,017 | 9/1987 | Taniguchi et al. . |
| 5,140,871 | 8/1992 | Goto et al. ............................ 701/51 X |
| 5,235,875 | 8/1993 | Yoshida et al. . |
| 5,267,491 | 12/1993 | Sumimoto et al. ...................... 477/155 |
| 5,301,572 | 4/1994 | Tanaka et al. . |
| 5,345,843 | 9/1994 | Fujita et al. . |
| 5,370,016 | 12/1994 | Fujita et al. . |
| 5,435,796 | 7/1995 | Fujita et al. . |
| 5,439,427 | 8/1995 | Enokido et al. ..................... 477/143 X |
| 5,443,432 | 8/1995 | Fujita et al. . |
| 5,445,577 | 8/1995 | Fujita et al. . |
| 5,445,579 | 8/1995 | Fujita et al. . |
| 5,454,763 | 10/1995 | Ikebuchi et al. . |
| 5,568,748 | 10/1996 | Carlson et al. ...................... 477/120 X |
| 5,583,768 | 12/1996 | Hamajima et al. ................... 701/53 X |
| 5,609,549 | 3/1997 | Usuki et al. . |
| 5,611,753 | 3/1997 | Kondo et al. . |
| 5,618,243 | 4/1997 | Kondo et al. . |
| 5,647,819 | 7/1997 | Fujita et al. ............................ 477/143 |
| 5,683,328 | 11/1997 | De Schepper et al. ............. 477/154 X |

FOREIGN PATENT DOCUMENTS

| | | |
|---|---|---|
| 624950 A | 1/1987 | Japan . |
| 5180320A | 7/1993 | Japan . |
| 5256354A | 10/1993 | Japan . |

*Primary Examiner*—Dirk Wright
*Assistant Examiner*—Peter T. Kwon

[57] ABSTRACT

A shift control method for an automotive automatic transmission is provided, which reduces a shift shock particularly at the time of a skip down-shift, and shortens a required shifting time period. An electronic control unit of a shift control apparatus releases the engagement of a clutch of a subsidiary transmission mechanism and engages a one-way clutch so as to establish a gear position not used in the normal speed change when a shift command from the fifth shift position to the third shift position is issued, gradually decreasing a valve opening duty ratio of an electromagnetic valve associated with a brake of a main transmission mechanism from an initial value $D_{HLi}$ before this gear position is established, determines an average turbine rotation speed changing rate $dD_{TAVE}/dt$ from the detected turbine rotation speed (S203), and learning correction of the initial value $D_{HLi}$ is made if the changing rate deviates from a target range (S204–S208).

9 Claims, 17 Drawing Sheets

F I G. 13
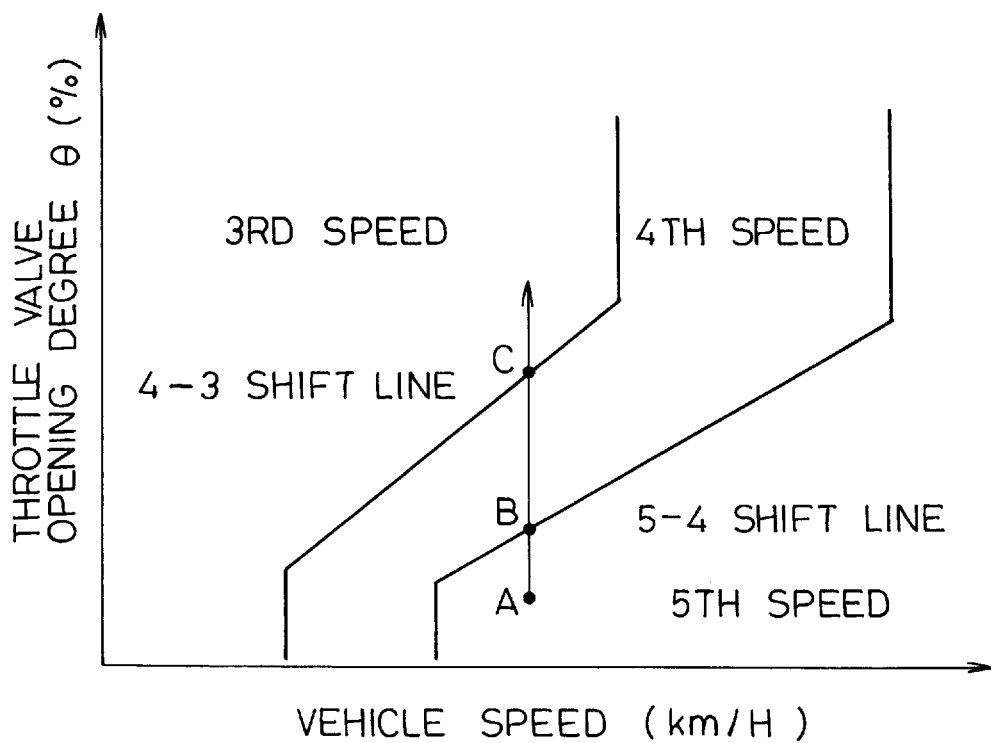

F I G. 14
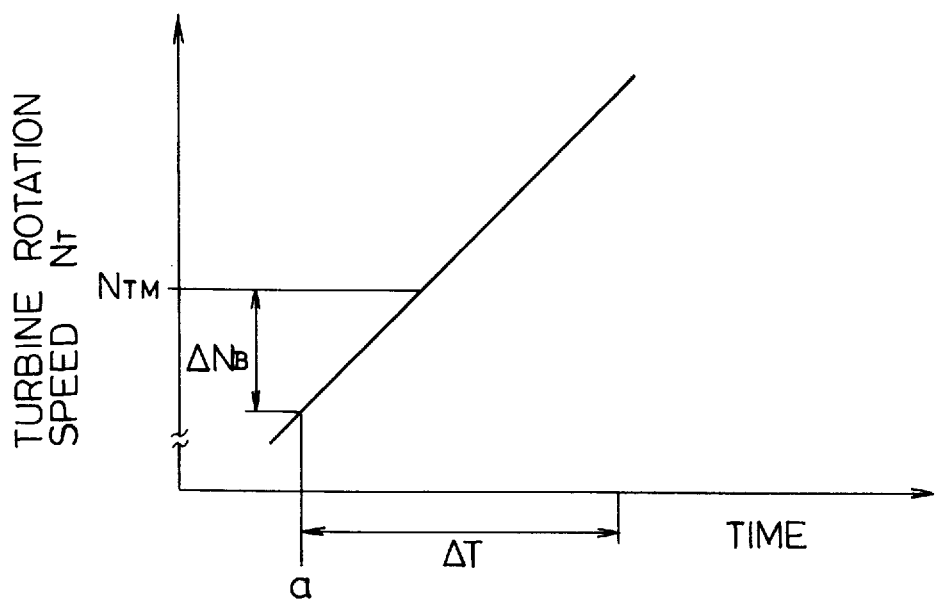
F I G. 15
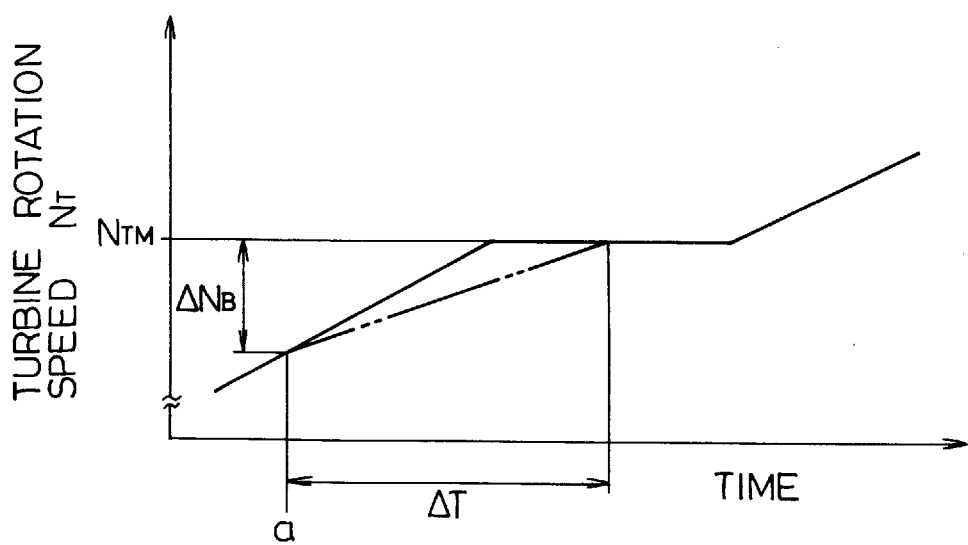

F I G . 16
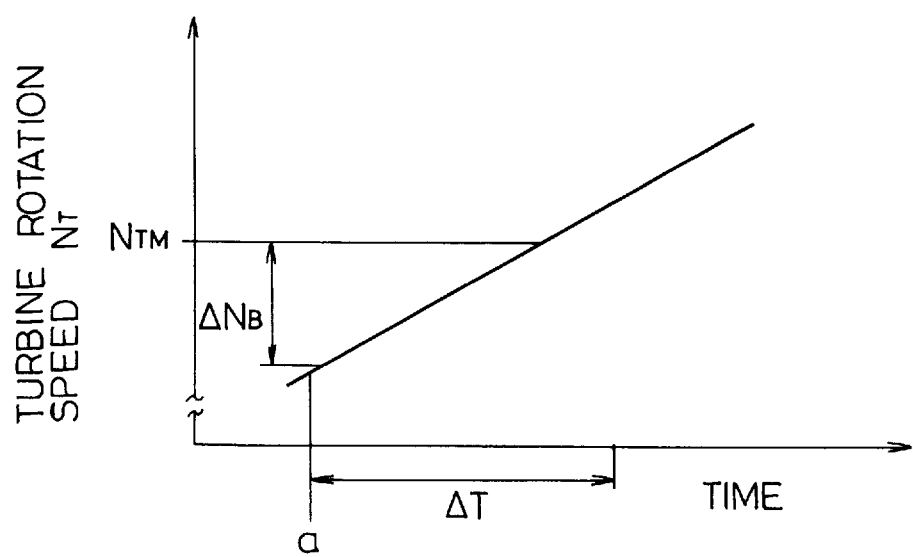

SHIFT CONTROL METHOD FOR AN AUTOMATIC TRANSMISSION

TECHNICAL FIELD

This invention relates to a shift control method for an automatic transmission, and more particularly, to a shift control method for an automatic transmission which is capable of reducing a shift shock caused by a skip down-shift and shortening a time period required for shifting.

BACKGROUND ART

An automotive automatic transmission generally includes a transmission mechanism having planetary gear units which include shift change elements (hereinafter referred to as gears) such as sun gears and planetary carriers and having hydraulic friction engaging elements such as hydraulic wet-type multiple disk clutches and hydraulic band brakes (hereinafter referred to as clutches and brakes, respectively). In an automatic transmission of this type, the gear connection is changed over by releasing one(s) of the friction engaging elements associated with shift change and by engaging the other friction engaging element(s) associated with shift change, to select those gears which contribute to torque transmission, to thereby establish a desired shift position.

In recent years, in order to improve the drivability of automobiles and reduce the fuel consumption, attempts have been made to further enhance the degree of electronic control for automatic transmissions and increase the number of shift positions or transmission stages. A typical multi-stage automatic transmission includes a main transmission mechanism constructed by an existing transmission mechanism and a subsidiary transmission mechanism coupled in line, in respect of torque transmission, with the main transmission mechanism. Those gears of the two transmission mechanisms which contribute to torque transmission are combined in various manners, to thereby establish an arbitrary one of a required number of shift positions, e.g., five forward shift positions and one reverse shift position. For example, the gear connection in the main transmission mechanism is changed over to effect a shift change operation among the first, second and third shift positions, and the gear connection in the subsidiary transmission mechanism is changed over to effect a shift change operation between the third and fourth shift positions. Further, to carry out a shift change between the fourth and fifth shift positions, the gear connection in the main transmission mechanism is changed over, with the gear engagement state (torque transmission path) in the subsidiary transmission mechanism set so as to correspond to the fourth shift position. In other words, by use of the subsidiary transmission mechanism, a switching is made between the lower-speed shift positions including the first through third shift positions and the higher-speed shift positions including the fourth and fifth shift positions.

In an electronic controlled automatic transmission, a shift map determined as a function of vehicle speed and throttle valve opening degree, as shown in FIG. 13, is generally used to select a shift position. From this map, an optimum shift position (target shift position) suitable to detected values of the vehicle speed and throttle valve opening degree is selected. In the case of a kick-down at a rapid acceleration, the target shift position is generally determined by the throttle valve opening degrees. That is, when the throttle valve opening degree traverses the 5–4 shift line or 4–3 shift line shown in FIG. 13, a down-shift command is output. As a result, if the accelerator pedal is depressed by the driver and the throttle valve opening degree $\theta$ reaches the point B from the point A in FIG. 13, a down-shift is carried out from the fifth shift position to the fourth shift position. When the throttle valve opening degree $\theta$ reaches the point C from the point A, a so-called skip down-shift from the fifth shift position to the third shift position is effected.

On an occasion that a direct down-shift from the fifth shift position to the third shift position is effected in the aforementioned multi-stage automatic transmission, that is, a skip down-shift is effected, it is necessary to make the changeover of gear connection in both of the main and subsidiary transmission mechanisms. However, to simultaneously control a plurality of transmission mechanisms, an advanced technique such as the modern control theory must generally be used.

Further, in the automatic transmission, the shift control is generally effected based on the outputs of two rotation speed sensors respectively indicating the rotation speeds of the input and output shafts of the transmission. However, the shift change condition in each of the main and subsidiary transmission mechanisms cannot be detected based on the outputs of the two sensors. Therefore, it is extremely difficult to simultaneously control the shift change operations in both of the transmission mechanisms based on the two sensor outputs. Provision of additional rotation speed sensors makes it possible to detect the shift change condition of each transmission mechanism, and, in turn, to simultaneously control a plurality of transmission mechanisms. In this case, however, the cost rises.

Conventionally, therefore, in order to carry out a skip down-shift, the gear connection in the main transmission mechanism is first changed over, and then the changeover of gear connection is made in the subsidiary transmission mechanism. For example, for the down-shift from the fifth shift position to the third shift position, a method has been adopted in which the fourth shift position is temporarily established during the downshift, so that the downshift is carried out by way of the fourth shift position. However, this type of shift control method entails the following defects.

As is well known in the art, the release of a clutch or brake, which is a hydraulic friction engaging element, requires a predetermined period of time corresponding to a response delay in oil pressure release. Therefore, even if a down-shift command for instructing a shifting to the third shift position is issued immediately after the temporary establishment of the fourth shift position, the fourth shift position is kept established until the predetermined time period elapses because of the presence of the delay in oil pressure release. Further, to establish the fourth shift position, it is necessary to make a time-consuming determination as to the synchronization of rotation speeds of the input and output shafts of the transmission. According to the conventional method in which a skip down-shift is made by effecting a one-step down-shift plural times, a shift shock occurs each time the one-step down-shift is effected and a period of time required for shifting becomes longer. Therefore, the ride qualities and shift response are degraded.

DISCLOSURE OF THE INVENTION

An object of this invention is to provide a shift control method for an automatic transmission, which is capable of alleviating a shift shock occurring at the time of shifting, particularly at the time of a skip down-shift, and capable of shortening a time period required for shifting.

The shift control method according to this invention is applied to an automotive automatic transmission having a main transmission mechanism and a subsidiary transmission mechanism arranged in series with each other in a power transmission system. Each transmission mechanism is constructed so as to selectively establish plural gear positions. The automatic transmission is constructed so as to selectively establish the first and second shift positions by a combination of a gear position established in the main transmission mechanism and a gear position established in the subsidiary transmission mechanism.

The shift control method according to this invention comprises the steps of starting a shift change operation for establishing a gear position, corresponding to the second shift position, in either one of the main and subsidiary transmission mechanisms in response to a shift command instructing a shift from the first shift position to the second shift position; starting a shift change operation for establishing a gear position, corresponding to the second shift position, in the other transmission mechanism before the shift change operation in said one of the transmission mechanisms is completed; detecting an input shaft rotation speed of the automatic transmission; and learning-correcting a value of a parameter governing the start of the shift change in the other transmission mechanism based on a changing rate of the input shaft rotation speed.

An advantage of this invention is that a smooth relation can be attained between the shift change operation on the main transmission mechanism side and that on the subsidiary transmission mechanism side even in a case where the automatic transmission entails manufacturing variations or deterioration with the lapse of time. As a result, a shift change (particularly, a skip down-shift) on the automatic transmission can stably be carried out smoothly within a short period of time, and a shift shock (particularly in the skip down-shift, a shift shock occurring when the speed change on the one transmission mechanism is completed) can be reduced.

In this invention, preferably, the parameter value learning-correcting step includes learning-correcting the parameter value based on a changing rate of the input shaft rotation speed observed during a time period from a time the shift change operation in said one transmission mechanism is completed to a time a predetermined period of time has elapsed since the start of the shift change operation in said one transmission mechanism. More preferably, the parameter value learning-correcting step includes determining an average value of changing rates of the input shaft rotation speed and learning-correcting the parameter value based on the average value.

According to these preferred embodiments, a determination as to whether or not, immediately after the completion of the shift change operation on one of the main and subsidiary transmission mechanisms, the shift change operation on the other transmission mechanism is started properly can be made exactly. Also, the learning correction of the parameter value can be made so as to meet the result of the above determination. As a result, the shift change operation on the other transmission mechanism can be started more properly once the learning correction has been made, and therefore, a shift shock can be reduced.

In this invention, preferably, the parameter is an engagement force of that friction element which is released when the second shift position is established. The step of starting the shift change operation in the other transmission mechanism includes decreasing the engagement force of the friction element. More preferably, the step of starting the shift change operation in the other transmission mechanism includes decreasing the engagement force of the friction element to a preset value. The parameter value learning-correcting step includes learning-correcting the preset value based on the changing rate of the input shaft rotation speed.

According to these preferred embodiments, it is possible to exactly determine whether or not that engagement force (preferably, the preset value of the engagement force) is proper which is observed when the shift change operation on said other transmission mechanism is started immediately after the completion of the shift change operation on said one of the main and subsidiary transmission mechanisms. Also, the learning correction of the value of engagement force (preferably, the preset value of engagement force) can be made in a manner suitable to the result of this determination. As a result, the shift change operation on the other transmission mechanism can be started properly, and a shift shock can be reduced.

Preferably, the shift control method according to this invention further comprises a step of detecting torque of the input shaft. The step of learning-correcting the parameter value includes learning-correcting the value of the parameter for each of those regions which are divided in accordance with the input shaft rotation speed or the input shaft torque.

According to this preferred embodiment, the learning correction of the parameter value can be made finely in accordance with a vehicle operating condition. Therefore, once the learning correction has been made, the shift change operation on the other transmission mechanism can be performed in a state more suitable for the vehicle operating condition at the start of the shift change, so that a shift shock can be reduced further.

BRIEF DESCRIPTION OF THE DRAWINGS

FIG. 13 is a diagram showing a shift map determined as a function of vehicle speed and throttle valve opening degree;

FIG. 14 is a graph showing a change in the turbine rotation speed $N_T$ with elapse of time which change is observed when the pressure of oil supplied to the second brake immediately after the establishment of 4'th shift position is determined is too low;

FIG. 15 is a graph showing a change in the turbine rotation speed $N_T$ with elapse of time observed when the pressure of oil supplied to the second brake is too high;

FIG. 16 is a graph showing a change in the turbine rotation speed $N_T$ with elapse of time observed when the pressure of oil supplied to the second brake falls within proper range;

BEST MODE OF CARRYING OUT THE INVENTION

With reference to the accompanying drawings, a shift control apparatus for an automotive automatic transmission will be described in detail to which apparatus a shift control method according to one embodiment of this invention is applied.

Figure 1:
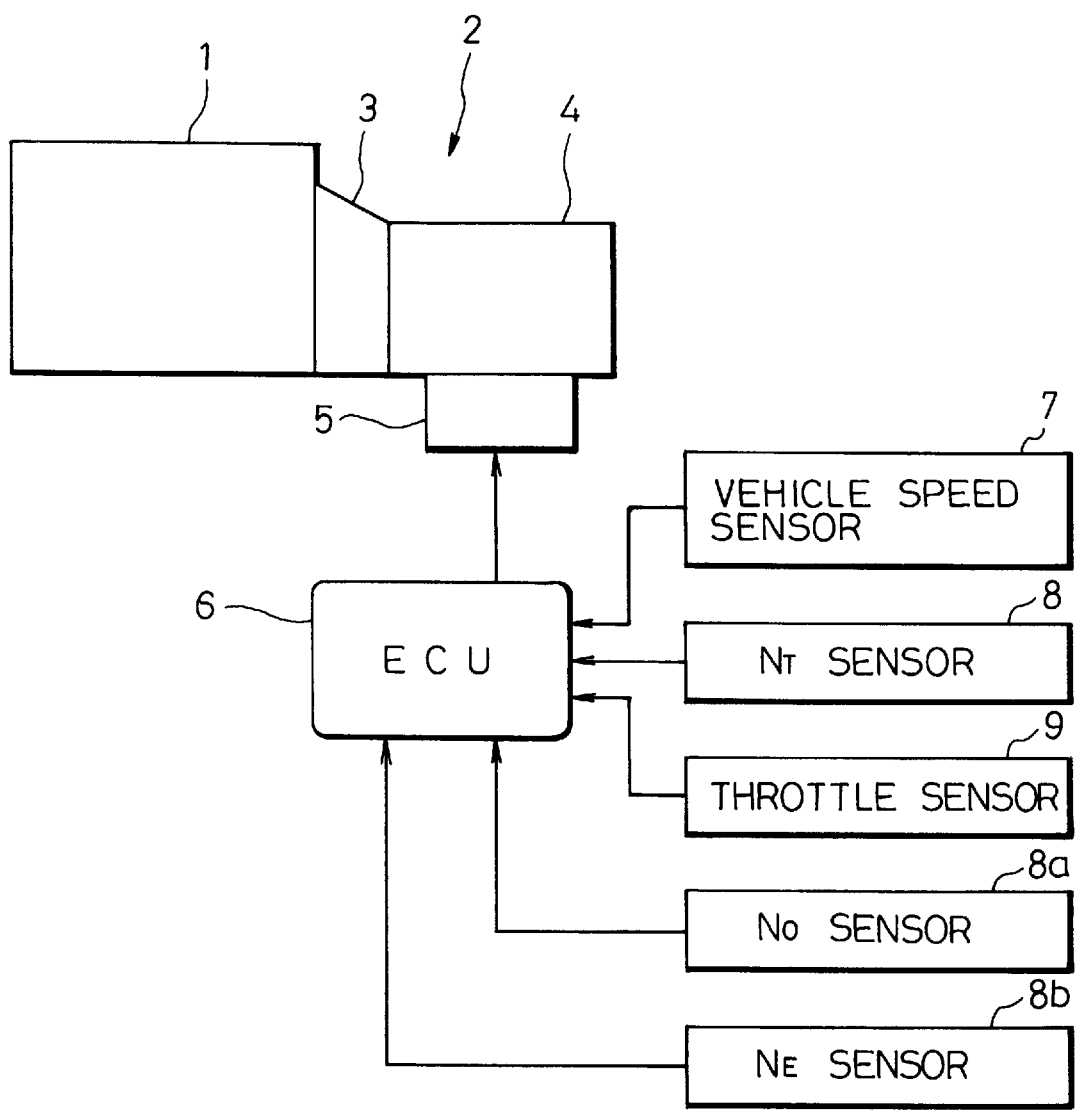
FIG. 1 is a schematic diagram showing a shift control apparatus for embodying a shift control method according to a first embodiment of this invention, together with an automatic transmission.

Referring to FIG. 1, an automatic transmission 2, which is comprised of a torque converter 3, an auxiliary transmission 4 and a hydraulic controller 5, is drivingly coupled with the crank shaft (not shown) of an engine 1 to transmit an output torque of the engine 1 to driving wheels (not shown) of a vehicle. In other words, the automatic transmission 2 forms part of a power transmission system of the vehicle.

The auxiliary transmission contains a plurality of sets of planetary gear units and hydraulic friction engaging elements such as hydraulic clutches and hydraulic brakes. The hydraulic controller 5 is formed with a hydraulic circuit, not shown, to which pressurized operating oil is supplied from a hydraulic pump (not shown) driven by the crank shaft of the engine 1. In the hydraulic circuit, a plurality of electromagnetic valves (not shown) duty-driven by an electronic control unit (ECU) 6 are disposed. These electromagnetic valves are operated under the control of the ECU 6 to control the supply of oil to the hydraulic friction engaging elements of the transmission 4 so as to establish a desired one of a plurality of shift positions, for example, five forward shift positions and one reverse shift position, of the transmission 4.

The ECU 6 has an input/output device, memory devices (nonvolatile RAM, ROM or the like), a central processing unit (CPU), timer counters and the like, which are not shown in the drawings. The ECU 6 has its input side to which are connected a vehicle speed sensor 7 for detecting the traveling speed V of the vehicle, an $N_T$ sensor 8 (input shaft rotation speed detecting means) for detecting the turbine rotation speed $N_T$ of the torque converter 3, that is, the rotation speed of the transmission input shaft, a throttle sensor 9 for outputting a voltage $V_{TH}$ indicating the throttle valve opening degree θ (engine load), an $N_O$ sensor 8a or detecting the rotation speed $N_O$ of the transmission output shaft, and an $N_E$ sensor 8b for detecting the engine rotation speed. The ECU 6 cooperates with the sensors 7, 8, 8a, 8b and 9 and the hydraulic controller 5 to form a shift control apparatus for carrying out the shift control method of this embodiment. In addition to the sensors 7 to 9, the ECU 6 is connected to various sensors and switches such as an inhibitor switch for detecting the position of the shift lever. Since these elements are not directly related to this embodiment, they are not shown in the drawing.

Figure 2:
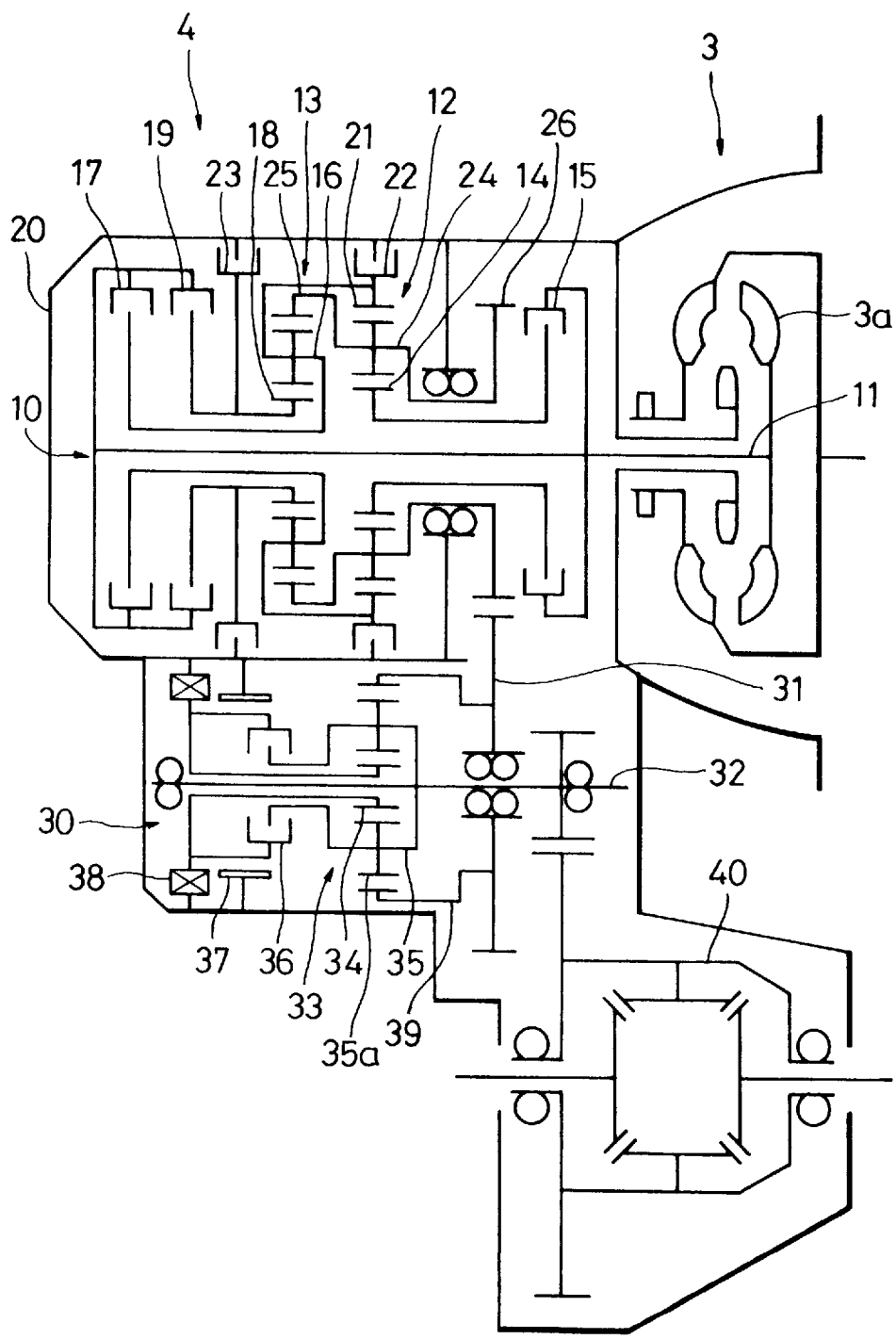
FIG. 2 is a skeleton diagram showing the gear train of an auxiliary transmission shown in FIG. 1.

Referring to FIG. 2, the auxiliary transmission 4 includes a main transmission mechanism 10, and a subsidiary transmission mechanism 30 coupled in line, from the viewpoint of engine torque transmission, with the main transmission mechanism 10. The main transmission mechanism 10 includes an input shaft 11 coupled to a turbine 3a of the torque converter 3 for rotation in unison therewith, and first and second planetary gear units 12 and 13 supported on the input shaft 11. Input sides of first, second and third clutches 15, 17 and 19 are drivingly coupled to the input shaft 11. The clutches 15, 17 and 19 each have input and output sides which are engaged with each other when operating oil is supplied to an oil chamber (not shown) containing an engaging piston of the clutch and the engagement between which is released when the operating oil is discharged from the oil chamber. The output sides of the first, second and third clutches 15, 17 and 19 are respectively coupled to a sun gear 14 of the first planetary gear unit 12, a pinion carrier 16 of the second planetary gear unit 13, and a sun gear 18 of the second planetary gear unit 13.

Therefore, the sun gear 14 and the input shaft 11 are drivingly coupled to each other when the first clutch 15 is engaged, the pinion carrier 16 and the input shaft 11 are drivingly coupled to each other when the second clutch 17 is engaged, and the sun gear 18 and the input shaft 11 are drivingly coupled to each other when the third clutch 19 is engaged.

In the main transmission mechanism 10, first and second brakes 22, 23 each containing an engaging servo device (not shown) are mounted to a casing 20 of the transmission 4. The first brake 22 is designed to be brought into an engaged state to fix an internal gear 21 of the first planetary gear unit 12 to be unrotatable, when operating oil is supplied to a servo device of the first brake and to permit rotation of the internal gear 21 when the operating oil is discharged from the servo device. Likewise, the second brake 23 fixes the sun gear 18 of the second planetary gear unit 13 when operating oil is supplied thereto and permits rotation of the sun gear 18 when the operating oil is discharged therefrom. The internal gear 21 of the first planetary gear unit 12 and the pinion carrier 16 of the second planetary gear unit 13 are arranged to rotate together, the pinion carrier 24 of the first planetary gear unit 12 and the internal gear 25 of the second planetary gear unit 13 are arranged to rotate together, and the pinion carrier 24 is directly coupled to the drive gear 26. Rotation of the input shaft 11 is transmitted to a driven gear 31 on the subsidiary transmission mechanism 30 side via the planetary gear units 12, 13 and drive gear 26.

The subsidiary transmission mechanism 30 includes a counter shaft 32, and a third planetary gear unit 33 and a fourth clutch 36 which are supported by the counter shaft 32. The input and output sides of the fourth clutch 36 are engaged when operating oil is supplied to an oil chamber (not shown) containing an engaging piston thereof, and the engagement of the input and output sides thereof is released when the operating oil is discharged therefrom. The third planetary gear unit 33 includes a sun gear 34 disposed for rotation in unison with the output side of the fourth clutch 36, a pinion carrier 35 disposed for rotation in unison with the input side of the fourth clutch 36, and an internal gear 39 disposed for rotation in unison with the driven gear 31. The sun gear 34 and the pinion carrier 35 are coupled together when the fourth clutch 36 is engaged.

Further, the subsidiary transmission mechanism 30 includes a third brake 37 mounted on the casing 20 of the transmission 4 for fixing the sun gear 34, and a one-way clutch (O/W clutch) 38 mounted on the casing 20 in parallel, in respect of engine torque transmission, with the third brake 37. The one-way clutch 38 locks the sun gear 34 to prevent rotation of the sun gear 34.in the driving direction when the engagement of the fourth clutch 36 is released to release the engagement between the sun gear 34 and the pinion carrier 35.

Then, rotation of the driven gear 31 caused by rotation of the input shaft 11 of the main transmission mechanism 10 is transmitted to the counter shaft 32 via the third planetary gear unit 33 and is further transmitted from the counter shaft 32 to a differential carrier 40.

In the automatic transmission 2 of this embodiment, as indicated in Table 1, a desired one of a plurality of shift positions including the first to fifth shift positions is established by controlling the engagement/disengagement of the first to fourth clutches 15, 17, 19, 36 and the first to third brakes 22, 23, 37, which are friction engaging elements. In Table 1, a mark ○ indicates the engaged state of each clutch or brake and a mark Δ indicates the locked state of the one-way clutch 38.

As indicated in Table 1, in order to establish a desired shift position in the automatic transmission 2, the friction engaging elements associated with the desired shift position are engaged, so that corresponding ones of those shift change elements which contribute to the power transmission in the shift position to be established are engaged.

For example, in order to establish the fifth shift position, the second clutch 17, second brake 23 and fourth clutch 36 which are the friction elements associated with the fifth shift position are engaged. By the engagement of the second clutch 17, the input shaft 11 and the pinion carrier 16 which serve as a pair of shift change elements associated with the fifth shift position are engaged. Further, by the engagement of the second brake 23, the sun gear 18 and the casing 20 which serve as a different pair of shift change elements are engaged, and by the engagement of the fourth clutch 36, the sun gear 34 and the pinion carrier 35 which serve as a still different pair of shift change elements are engaged.

TABLE 1

| | | Shift Position | | | | | | | |
|---|---|---|---|---|---|---|---|---|---|
| Friction engaging elements | | 1st | 2nd | 3rd | 4th | 5th | R | N, P | 4'th |
| Main transmission mechanism | 1st clutch 15 | ○ | ○ | ○ | ○ | | | | |
| | 2nd clutch 17 | | | ○ | ○ | ○ | | | ○ |
| | 3rd clutch 19 | | | | | | ○ | | |
| | 1st brake 22 | ○ | | | | | ○ | | |
| | 2nd brake 23 | | ○ | | | ○ | | | ○ |
| Subsidiary transmission mechanism | 4th clutch 36 | | | | ○ | ○ | | | |
| | 3rd brake 37 | ○ | ○ | ○ | | | ○ | ○ | ○ |
| | O/W clutch 38 | Δ | Δ | Δ | | | | | Δ |

In order to establish the third shift position, the first clutch 15, the second clutch 17 and the third brake 37 are engaged.

In this embodiment, for the down-shift from the fifth shift position to the third shift position, that shift position (hereinafter referred to as 4'th shift position) which is not used in a normal shifting operation, that is, in a down-shift of one step or up-shift of one step, is used in the process of the down-shift. To establish the 4'th shift position, the second clutch 17, second brake 23 and third brake 37 are engaged.

Therefore, in the down-shift from the fifth shift position to the 4'th shift position, the fourth clutch 36 is released and the third brake 37 is engaged. Since an increase in the speed of the sun gear 34 can be prevented by the one-way clutch 38 even if the engagement of the third brake 37 is not completed, there is no possibility that the sun gear 38 is driven at an over speed even at the time of power-ON, i.e., at the time of step-on of the accelerator pedal, so that the 4'th shift position is established.

Further, in the down-shift from the 4'th shift position to the third shift position, the second brake 23 is released and the first clutch 15 is engaged. Thus, in the skip down-shift from the fifth shift position to the third shift position, the function of the one-way clutch 38 can be utilized by using the, 4'th shift position which is not used in the normal shifting operation, as distinct from the conventional skip down-shift from the fifth shift position to the third shift position by way of the fourth shift position, in which the function of the clutch 38 is not utilized.

Next, the shift control process executed by the ECU 6 at the time of 5–3 down-shift is explained with reference to the flowcharts of FIGS. 3 to 6 and the graphs of FIGS. 7 to 12.

Figure 7:
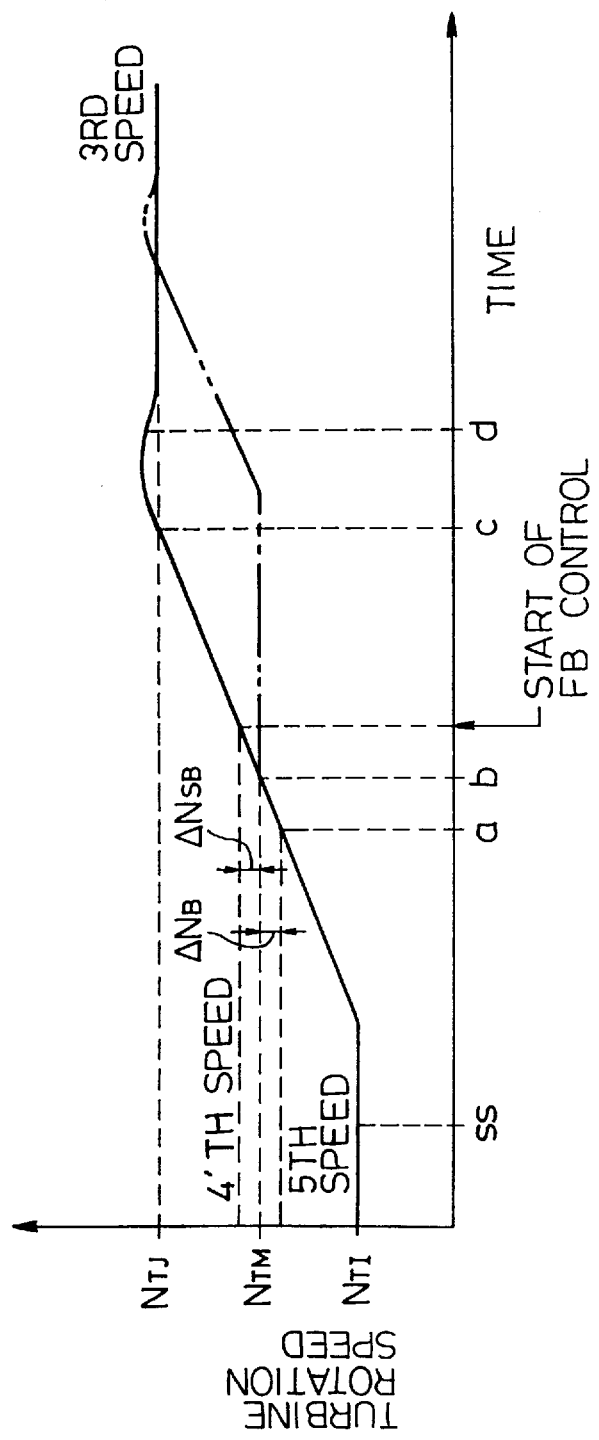
FIG. 7 is a graph showing a change in the turbine rotation speed with elapse of time during the 5–3 shift.

The graph of FIG. 7 shows a change in the turbine rotation speed $N_T$ at the time of shift-down from the fifth shift position to the third shift position, with the elapse of time represented along the abscissa.

In relation to the shift control operation, the ECU 6 serving as shift commanding means periodically determines whether or not the throttle valve opening degree θ traverses the shift line by use of the shift map of FIG. 13 and on the basis of the output of the throttle sensor 9, in the optimum shift position determining routine which is not shown.

Figure 3:
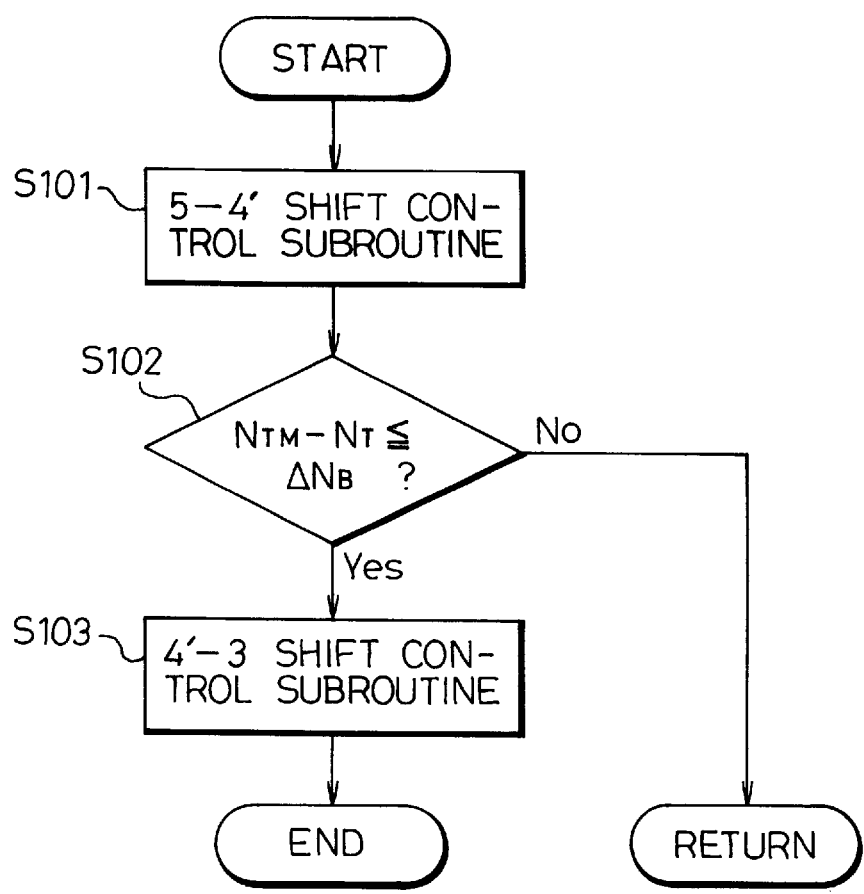
FIG. 3 is a flowchart showing a 5–3 shift control subroutine executed by the shift control apparatus show FIG. 1.

When the driver steps on the accelerator pedal while the car is running in the fifth shift position and if it is determined in the optimum shift position determining routine that the throttle valve opening degree θ is changed from the point A to the point C in FIG. 13 and traverses the 4–3 shift line, a 5–3 shift command is output and the 5–3 shift control subroutine of FIG. 3 is started (at the time point ss in FIGS. 7 to 11). This subroutine is executed at a predetermined control interval (for example, 5 ms).

In the subroutine of FIG. 3, the ECU serving as subsidiary transmission mechanism shift control means executes the 5–4' shift control subroutine (FIG. 4) in step 101.

Figure 4:
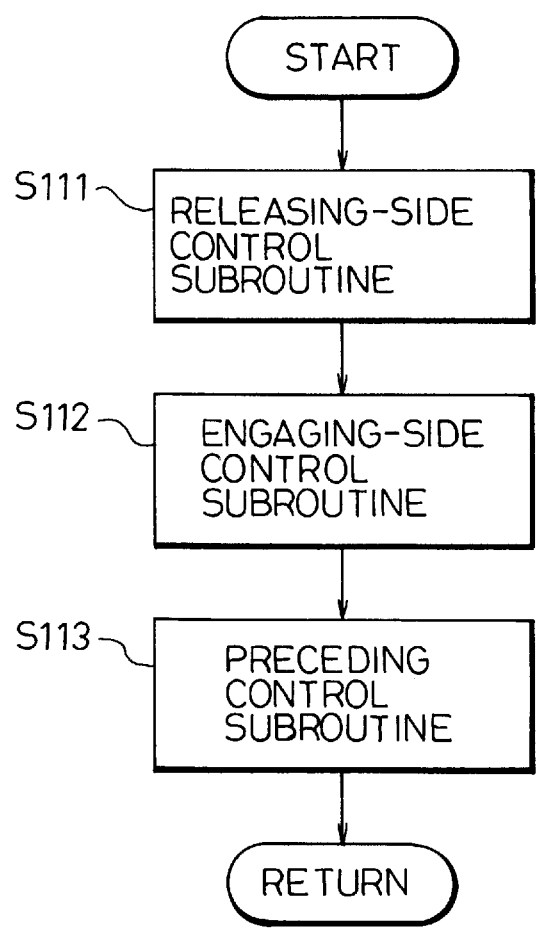
FIG. 4 is a flowchart showing in detail a 5–4' shift control subroutine shown in FIG. 3.
Figure 5:
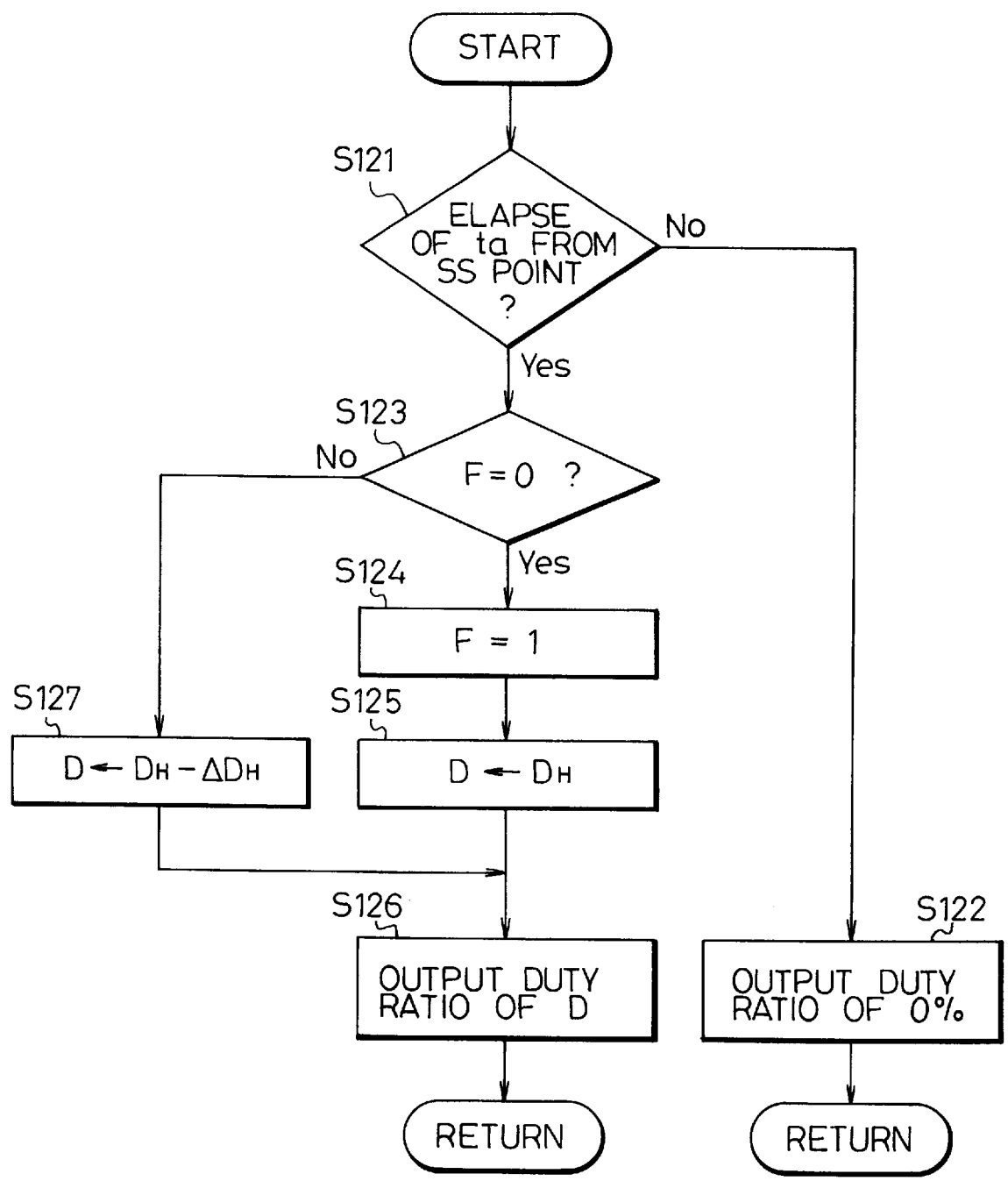
FIG. 5 is a flowchart showing in detail a preceding control subroutine shown in FIG. 4.

As shown in FIG. 4, in the 5–4' shift control subroutine, the releasing-side control subroutine for releasing the fourth clutch 36 of the subsidiary transmission mechanism 30 is first executed in step S111, the fourth clutch 36 serving as that friction engaging element which corresponds to the releasing-side shift change element in the 5–4' shifting process (releasing-side shift change element on the fifth-shift-position side). More specifically, the duty ratio of the electromagnetic valve associated with supply/discharge of operating oil for the fourth clutch 36 is controlled, as indicated by the solid line in FIG. 8, so as to discharge the operating oil from the fourth clutch 36.

In the next step S112, the engaging-side control subroutine for engaging the third brake 37 is executed. The third brake serves as that friction engaging element which corresponds to the engaging-side shift change element in the 5–4' shifting process (engaging-side shift change element on the 4'th shift position side). More specifically, the duty ratio of the electromagnetic valve associated with supply/discharge of operating oil for the third brake 37 is controlled, so as to supply the operating oil to the third brake 37.

In step S113, a preceding control subroutine (FIG. 5) for starting the releasing control for the second brake 23 is executed prior to the establishment of the 4'th shift position, the brake 23 being the friction engaging element corresponding to the releasing-side shift change element in the 4'–3 shifting process (releasing-side shift change element on the 4'th shift position side).

In this preceding control subroutine, in step S121, the ECU 6 reads the output of the $N_E$ sensor, which represents the engine rotation speed $N_E$, and the output of the $N_O$ sensor, which represents the rotation speed $N_O$ of the transmission output shaft, and determines the present gear ratio. As the present gear ratio, an optimum shift position determined in the optimum shift position determining routine described before in relation to the 5–3 down-shift command is used, for example. Then, the torque converter speed ratio e is calculated based on the engine rotation speed $N_E$, transmission output shaft rotation speed $N_O$ and present gear ratio. The turbine torque $T_{TM}$ corresponding to the thus calculated speed ratio e is derived by referring to a speed ratio e-turbine torque $T_{TM}$ map (not shown) previously stored in the associated memory device of the ECU 6. Further, a predetermined time period $t_a$ corresponding to the turbine torque $T_{TM}$ is derived by referring to a turbine torque $T_{TM}$—time period $t_a$ map shown, by way of example, in FIG. 12, and whether or not the predetermined time period $t_a$ has elapsed from the time when the 5–3 shift command is output (point ss) is determined.

If it is determined in step S121 that the predetermined time period $t_a$ has not yet elapsed, and hence the result of the determination in step S121 is "NO", the electromagnetic valve, associated with supply or discharge of operating oil with respect to the second brake 23 which is the friction engaging element corresponding to the releasing-side shift change element on the 4'th shift position side, is driven with the duty ratio 0% in step S122. As a result, as indicated by the two-dot chain line in FIG. 11, the engaging hydraulic pressure for the second brake 23 is rapidly reduced.

After the preceding control subroutine in the present cycle is completed as described above, the control flow proceeds to step S102 in FIG. 3, where the output of the $N_T$ sensor 8 indicative of the present: turbine rotation speed $N_T$ and the output of the $N_O$ sensor 8a indicative of the rotation speed of the transmission output shaft are read, and the 4'th-shift-position in-gear rotation speed (the turbine rotation speed indicating that the 4'th shift position has been established (4'th-shift-position synchronous rotation speed)) $N_{TM}$ is calculated by multiplying the output of the $N_O$ sensor and the gear ratio together. A 4'th-shift-position synchronization determining threshold value $\Delta N_B$ (for example, 40 rpm) previously stored in the associated memory device of the ECU 6 is read therefrom, and a rotation speed difference ($N_{TM}-N_T$) is calculated by deducting the present turbine rotation speed $N_T$ from the 4'th-shift-position in-gear rotation speed $N_{TM}$. Further, if the rotation speed difference ($N_{TM}-N_T$) is equal to or less than threshold value $\Delta N_B$ is determined.

If the result of the determination in step 102 is "NO", execution of the 5–3 shift control subroutine in the present cycle is completed, and the same subroutine is started again when a control time interval has passed. Therefore, the 5–4' shift control subroutine (step S101 in FIG. 3 (steps S111 to S113 in FIG. 4)) is successively executed until the turbine rotation speed $N_T$ becomes close to the 4'th-shift-position in-gear rotation speed $N_{TM}$.

Thus, as a result of the execution of 5–4' shift control subroutine (S101), the turbine rotation speed $N_T$ is increased from the fifth-shift-position in-gear rotation speed (the turbine rotation speed indicating that the fifth shift position has been established (fifth-shift-position synchronous rotation speed)) $N_{TI}$ to the 4'th-shift-position in-gear rotation speed $N_{TM}$.

Figure 8:
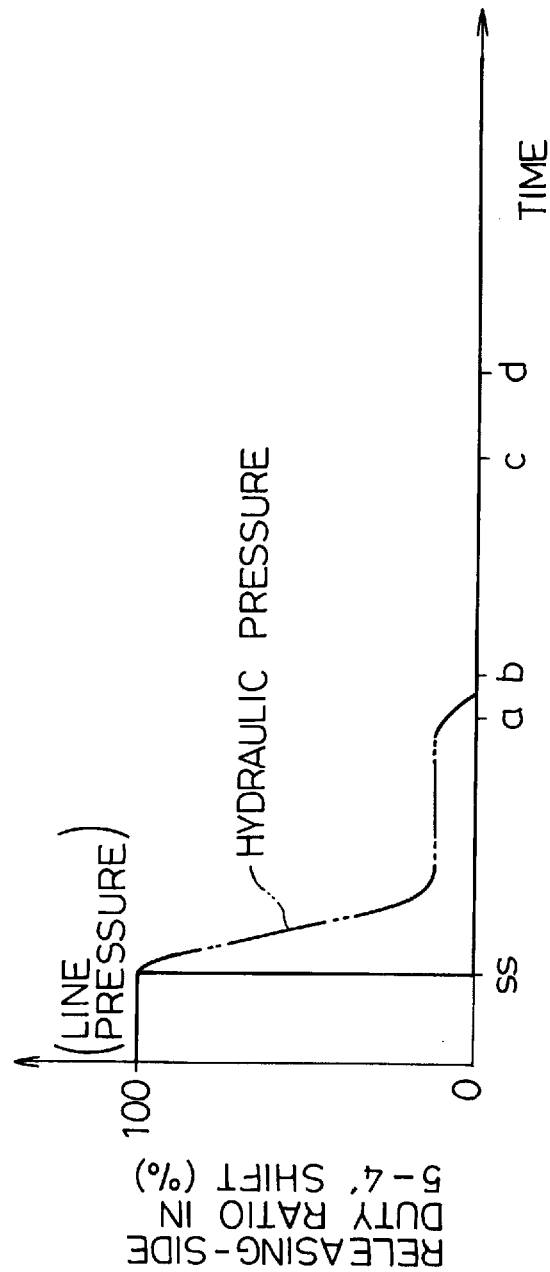
FIG. 8 is a graph showing a change with elapse of time in the valve opening duty ratio of an electromagnetic valve which is associated with a fourth clutch shown in FIG. 2 and serving as a releasing-side friction engaging element in the 5–4' shifting process.
Figure 9:
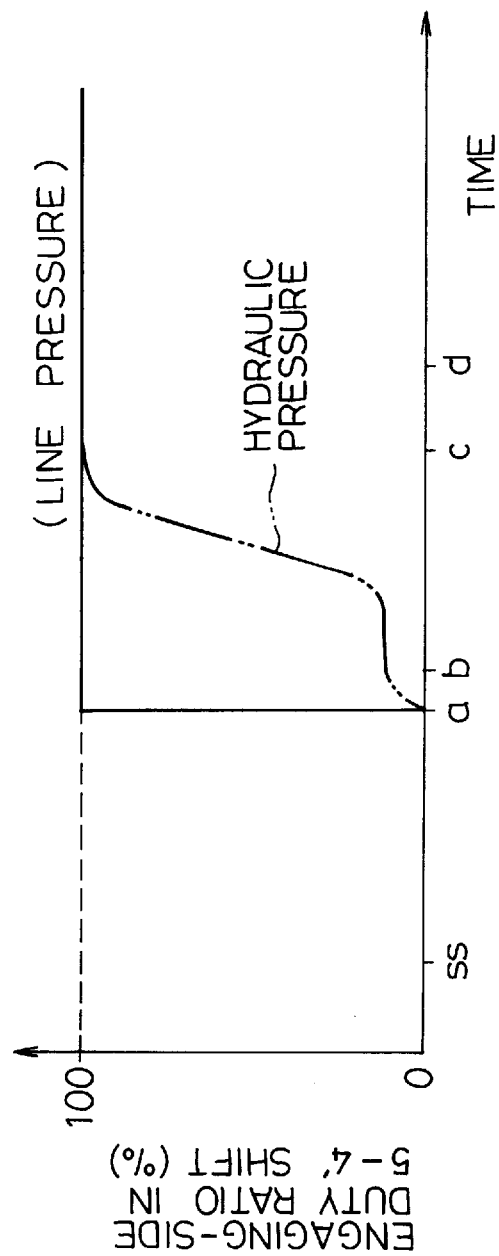
FIG. 9 is a graph showing a change with elapse of time in the valve opening duty ratio of an electromagnetic valve which is associated with a third brake shown in FIG. 2 and serving ass an engaging-side friction engaging element in the 5–4' shifting process.

Since the one-way clutch 38 is arranged in parallel to the third brake 37, the one-way clutch 38 is locked at an appropriate time if the fourth clutch 36 is released simply with the duty ratio being 0% as shown in FIG. 8, so that the 4'th shift position is established and the shift change of the subsidiary transmission mechanism 30 is completed. That is, the engagement of the third brake 37 is performed at a proper time (when 4'th shift position synchronization is completed) after the locking of the one-way clutch 38 as shown in FIG. 9.

During the time when the fifth shift position is established, since the fourth clutch 36 is engaged, the internal gear 39, carrier 35 and sun gear 34 of the third planetary gear unit 33 rotate in unison in the same direction at the same rotation speed.

However, the releasing of the fourth clutch 36 produces a difference in rotation speed among these elements.

In the 5–4' shift, since the engine 1 is in the power-ON state for which the accelerator pedal is stepped on, the speeds of the input shaft 11, drive gear 26 and driven gear 31 are increased. Accordingly, the speed of the internal gear 39 is also increased as compared with the time when the fifth shift position is established.

On the other hand, the carrier 35 is coupled to the load (tire) via the counter shaft 32 and differential carrier 40. Therefore, during the shift, the carrier 35 rotates at the same rotation speed as that observed when the fifth shift position was established, that is, at a rotation speed lower than that of the internal gear 39.

That is to say, the sun gear 34 is decreased in speed by being subjected to a rotation force given by the internal gear 39 via the planetary gear 35a and acting in the direction reverse to the rotation direction in the establishment of the fifth shift position.

The speed of the sun gear 34 becomes zero at a certain point of time so that the sun gear 34 is going to rotate in the reverse direction. However, the rotation is stopped by the locking of the one-way clutch 38, and the 4'th shift position is achieved.

During the execution of the 5–4' shift control subroutine in a subsequent control cycle, if it is determined in the step S121 that the predetermined time period $t_a$ has elapsed from the time when the 5–3 shift command is output, and therefore the result of determination in the step S121 is "YES", the control flow proceeds to step S123, where it is determined whether or not the value of the flag F is "0" which indicates that the predetermined time period $t_a$ has just elapsed. If the result of this determination is "YES", the value of the flag F is set to "1" (step S124), and the duty ratio D of the electromagnetic valve associated with the second brake 23 is set to the initial value $D_H$ (hereinafter referred to as initial duty ratio $D_H$) by the ECU 6, which serves as engagement force reducing means (step S125). Next, the electromagnetic valve is driven with the duty ratio D set in step 125 (step S126). Whereupon the execution of the preceding control subroutine in the present cycle is completed.

In the next cycle, the result of the determination in step S121 of the preceding control subroutine becomes "YES", and the result of the determination in the step S123 becomes "NO". Therefore, the control flow proceeds to step S127, where the duty ratio D is set to a value ($D_H - \Delta D_H$) which is obtained by deducting a predetermined value $\Delta D_H$ from the present initial duty ratio $D_H$. Then, the electromagnetic valve is driven with the duty ratio D set in step S127 (step S126). Whereupon the execution of the control subroutine in the present cycle is completed.

In the subsequent cycles, a series of electromagnetic valve driving processes consisting of steps S121, S123, S127 and S126 are executed repeatedly. As a result, the duty ratio of the second brake 23, which is the friction engaging element corresponding to the releasing-side shift change element on the 4'th shift position side, is gradually reduced from the initial duty ratio $D_H$, which is set to a slightly larger value by taking a margin for the sliding of the brake into consideration, as indicated by the solid line in FIG. 11. Therefore, the engaging hydraulic pressure for the second brake 23 is gradually lowered toward the least sufficient hydraulic pressure as the 5–4' shift process proceeds, as indicated by the two-dot chain line in FIG. 11.

As described above, in the 5–4' shift process, the releasing control of the fourth clutch 36 (and the engaging control of the third brake 37) is carried out, and the preceding control of the second brake which is released in the 4'–3 shift process is also carried out.

During the execution of the 5–3 shift control subroutine of FIG. 3, if it is determined in step S102 that the condition that $N_{TM} - N_T \leq \Delta N_B$ is satisfied, and therefore, if it is determined that the 4'th shift position has been established (point a in FIG. 11), then control flow proceeds to the step 103, where a 4'–3 shift control subroutine is executed.

When $N_T$ becomes substantially equal to $N_{TM}$, the rotation of the sun gear 34 of the third planetary gear unit 33 in the driving rotation-direction is locked by the one-way clutch 38 of the subsidiary transmission mechanism 30, so that the one-way clutch 38 takes the driving torque. Therefore, even when engagement of the third brake 37 is not completed, the 4'th shift position is established.

Figure 6:
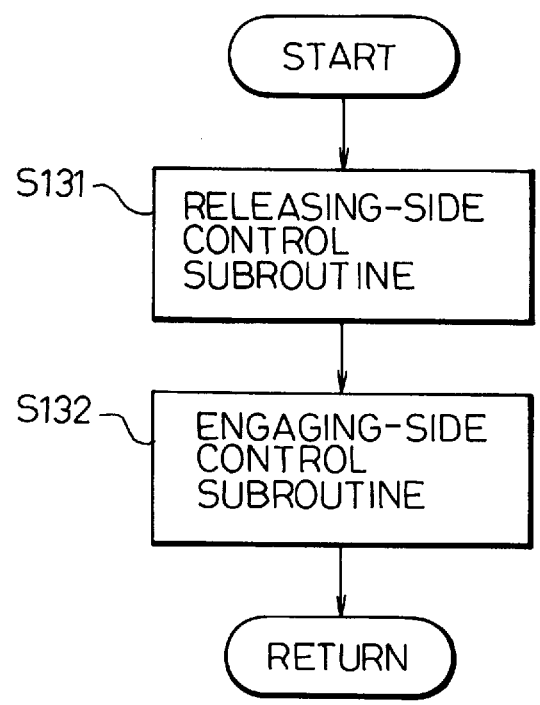
FIG. 6 is a flowchart showing in detail a 4'–3 shift control subroutine shown in FIG. 3.

As shown in FIG. 6, in the 4'–3 shift control subroutine, a releasing-side control subroutine for releasing the second brake 23 of the main transmission mechanism 10 is executed in the step S131 (continuous execution from the step S113 of the 5–4' shift control subroutine), the second brake 23 being a friction engaging element corresponding to the releasing-side shift change element on the 4'th shift position side. That is, operating oil is gradually discharged from the second brake 23, so that the sun gear 18 of the second planetary gear unit 13 is gradually released. Also, in step S132, an engaging-side control subroutine for engaging the first clutch 15 is executed, the first clutch 15 being a friction engaging element corresponding to the engaging-side shift change element on the third shift position side. That is, operating oil is supplied to the first clutch 15, so that the sun gear 14 of the first planetary gear unit 12 is brought to be engaged with the input shaft 11.

Figure 10:
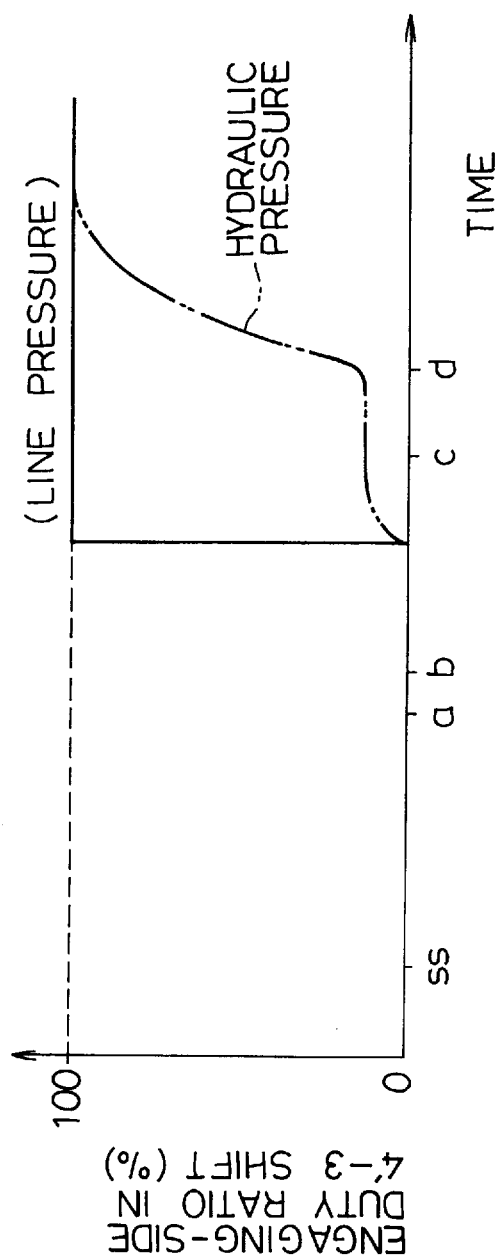
FIG. 10 is a graph showing a change in the valve opening duty ratio of an electromagnetic valve which is associated with a first clutch shown in FIG. 2 and serving as an engaging-side friction engaging element in he 4'–3 shifting process.
Figure 11:
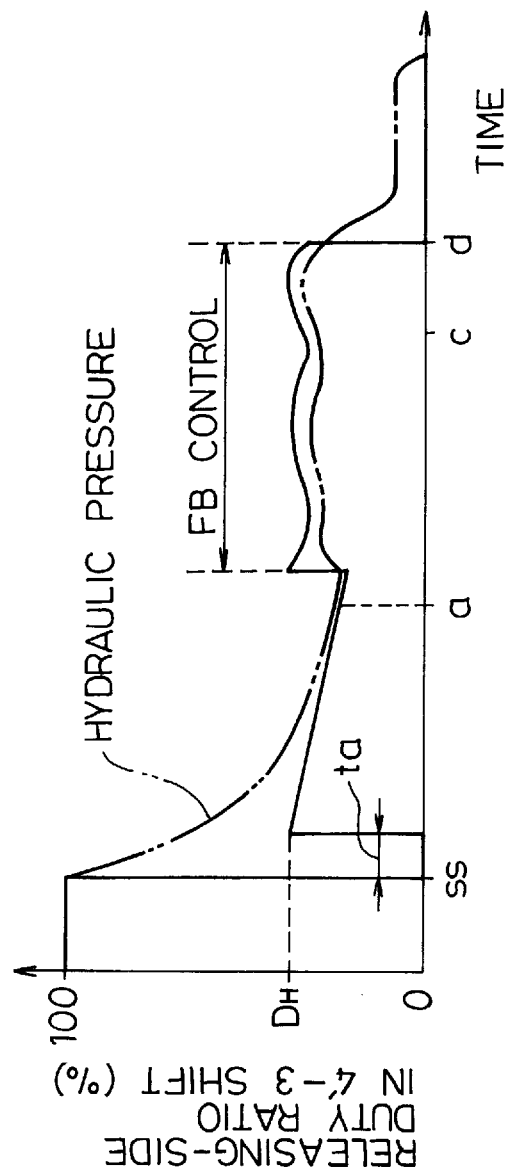
FIG. 11 is a graph showing a change in the valve opening duty ratio of an electromagnetic valve associated with a second brake which serves as a releasing-side friction engaging element in the 4'–3 shifting process.
Figure 12:
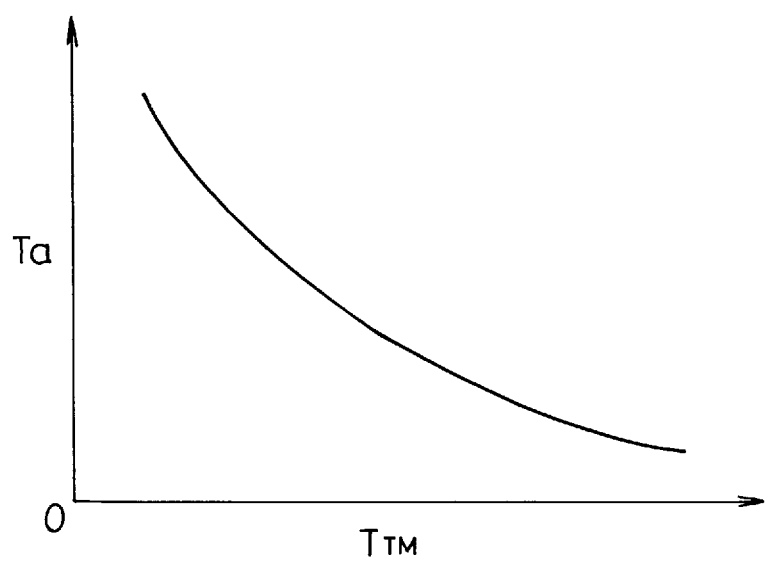
FIG. 12 is a graph showing, by way of example, a predetermined time period $T_a$-turbine torque $T_{TM}$ map referred to in the 5–3 shift control subroutine.

More specifically, in order to cause the changing rate of the turbine rotation speed $N_T$ from the 4'th-shift-position in-gear rotation speed $N_{TM}$ to the third-speed in-gear rotation speed $N_{TJ}$ to be equal to a target changing rate, the duty ratio of the electromagnetic valve associated with the second brake 23 of the main transmission mechanism 10 is feedback-controlled, as indicated by the solid line in FIG. 11, and the duty ratio of the electromagnetic valve associated with the first clutch 15 of the main transmission mechanism 10 is controlled as indicated by the solid line in FIG. 10. The feedback control (FB control) is started when it is determined that the condition that $N_T > N_{TM} + \Delta N_{SB}$ is satisfied (FIG. 7), where the symbol $\Delta N_{SB}$ is a determination threshold value (for example, 40 rpm). Switching of the duty ratio of the electromagnetic valve associated with the first clutch 15 from 0% to 100% is effected at the time point a preset period before the time of determination of third-shift-position synchronization (time point c in FIGS. 7 to 10).

After this, as the 4'–3 shift process proceeds, the operating oil is discharged from the second brake 23 to release the sun gear 18 of the second planetary gear unit 13, and the operating oil is supplied to the first clutch 15 to bring the sun gear 14 of the first planetary gear unit 12 to be coupled to the input shaft 11. As described above, the electromagnetic valve associated with the first clutch 15 is driven with the duty ratio 100% from the time before the time point of determination of third-shift-position synchronization (time point c). For this reason, the ineffective stroke of the first clutch 15 is just finished at the time of determination of third-shift-position synchronization, thereby rendering torque transmission via the first clutch 15 possible.

Even if the initial duty ratio DH employed in releasing the second brake 23, as described above, is set to a value such that the slipping of the second brake 23 is reliably avoided in the 5–4' shift process and the second brake 23 begins to slip just when the 4'th shift position is established, the initial duty ratio $D_H$ varies from transmission to transmission so that the initial duty ratio $D_H$ is smaller than the optimum value or inversely larger because the automatic transmission 2 (friction elements and electromagnetic valves) has an operating variation due to a manufacture error, deterioration with elapse of time, etc.

When the initial duty ratio $D_H$ is smaller than the optimum value, the second brake 23 begins to slip during the 5–4' shift process, so that the determination of completion of the 5–4' shift process (synchronization determination for 4'th shift position) cannot be conducted correctly, thereby making it impossible to carry out proper shift control.

That is, despite the fact that the subsidiary transmission mechanism 30 is actually in shift change, operation (during the 5–4' shift process), the rotation speed of the input shaft 11 detected by the, $N_T$ sensor 8 becomes a value equivalent to the rotation speed in the 4'–3 shift process. Thus, it is mistakenly determined based on the improperly detected rotation speed and the detection value from the $N_O$ sensor 8a that the shift change in the subsidiary transmission mechanism 30 side has completed. In this case, the third brake 37 is engaged, so that the shift change on the subsidiary transmission mechanism 30 in the shift process is forcibly finished, thereby producing a shock.

On the other hand, when the initial duty ratio $D_H$ is larger than the optimum value, the releasing operation of the second brake 23 delays, so that the relation between the 5–4' shift and the 4'–3 shift is not continuous, and a temporal stoppage occurs at the 4'th shift position (two-dot chain line in FIG. 7). Therefore, since the start of the 4'–3 shift process delays, the total shift time is consequently a increased, and a shock still occurs at the time when the 4'th shift position is established.

In this embodiment, therefore, the sum of a reference duty ratio $D_{HO}$ previously stored in the ROM of the ECU 6 and a learned value $D_{HLi}$ is used as the duty ratio $D_H$ of the electromagnetic valve associated with the second brake 23, and the learned value $D_{HLi}$ is subject to a learning-correction.

In this embodiment, paying attention to the fact that the average value of the turbine rotation speed changing rate $N_T$ (gradient of the turbine rotation speed $N_T$) is higher as shown in FIG. 14 when the hydraulic pressure supplied to the second brake .23 (initial duty ratio $D_H$) is too low, while it is lower as shown in FIG. 15 when the hydraulic pressure is too high, the initial duty ratio $D_H$ is learning-corrected based on the average turbine rotation speed changing rate $N_{TAVE}$ within a predetermined time (for example, 64 ms) from the completion of shift change in the subsidiary transmission mechanism 30 (determination of completion of 5–4' shift process) so that the 5–4' shift and the 4–3 shift are connected smoothly.

The control process for learning correction of the initial duty ratio $D_H$ will be described below.

Figure 17:
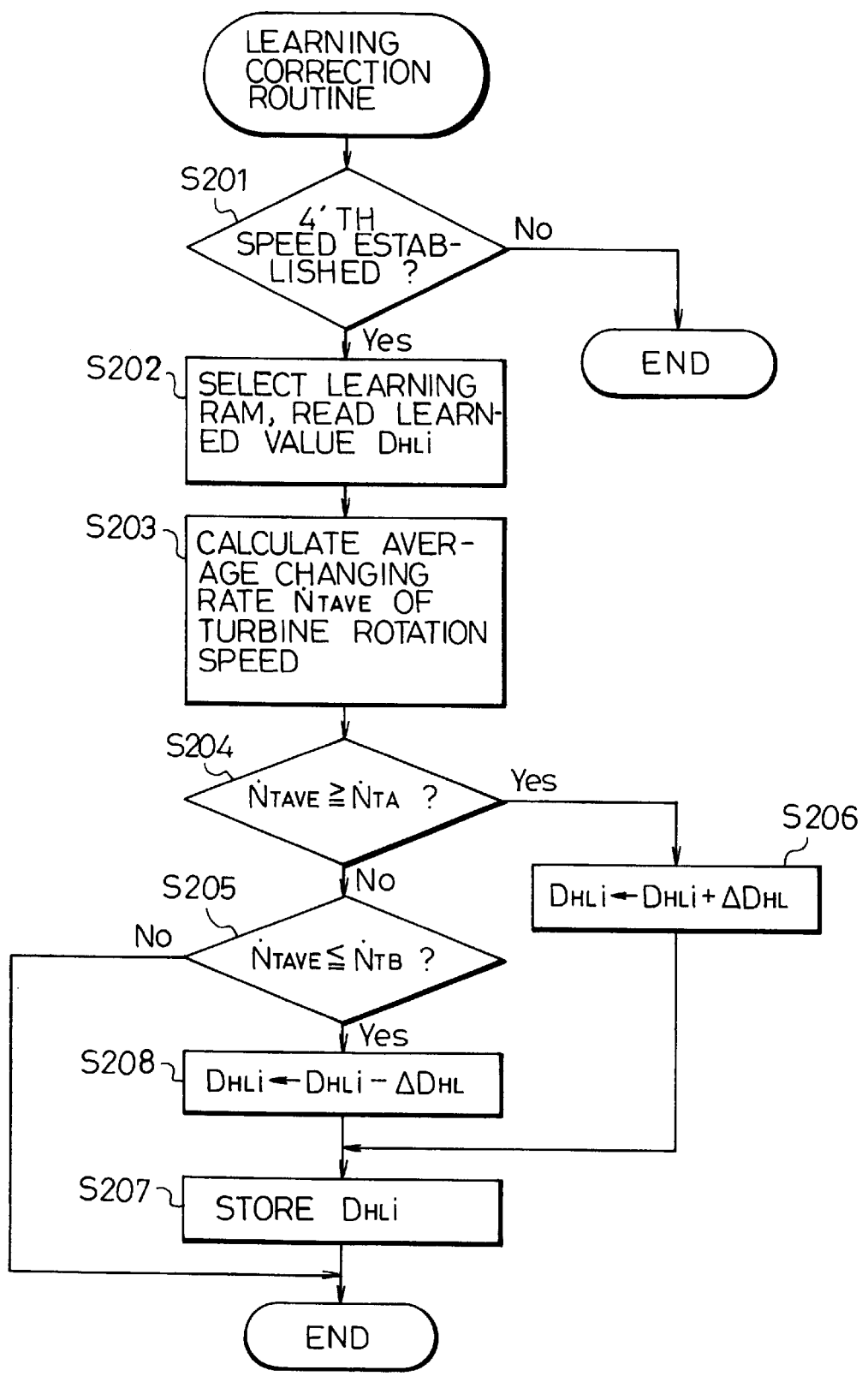
FIG. 17 is a flowchart of a learning-correction routine for a duty ratio $D_H$ which is executed in parallel with the shift control routines shown in FIGS. 3 to 6.

In parallel to the shift routine shown in FIGS. 3 to 6, the learning correction routine shown in FIG. 17 is executed at predetermined intervals by the ECU 6, which serves as learning correction means.

In this learning correction routine, it is first determined by the process in step S102 shown in FIG. 3 whether or not the 4'th shift position has been established (step S201). If the result of this determination is "NO", the execution of the learning correction routine in the present control cycle is completed.

If it is concluded in the step S201 in a subsequent cycle of executing the learning correction routine that the 4'th shift position has been established, and therefore, the result of the determination in step S201 is "YES", the control flow proceeds to step S202.

In step S202, a determination is made as to which of a plurality of predetermined turbine rotation speed regions, for example, regions divided into four as shown in Table 2, the turbine rotation speed $N_T$ at the start time of 5–4' shift belongs. According to the result of the determination, one of first to fourth learning RAMs corresponding to the first to fourth turbine rotation speed regions, respectively, is selected. The initial duty ratio learned values $D_{HLi}$ (i=1 to 4) are stored in the first to fourth learning RAMs, respectively, in a manner permitted to be updated. The learned value $D_{HLi}$ is read from the selected RAM, and stored in an associated one register of the ECU 6.

TABLE 2

|  | Turbine rotation speed NT (rpm) |
|---|---|
| 1st turbine rotation speed region | NT < 2000 |
| 2nd turbine rotation speed region | 2000 ≦ NT < 2600 |
| 3rd turbine rotation speed region | 2600 ≦ NT < 3200 |
| 4th turbine rotation speed region | 3200 ≦ NT |

The reason why the learning correction of the duty ratio $D_H$ is made for each turbine rotation speed region based on the turbine rotation speed $N_T$ at the start time of 5–4' shift as described above is that the hydraulic pressure supplied to the second brake 23 is intended to be controlled finely according to the vehicle operating condition at the start time of shifting.

Figure 18:
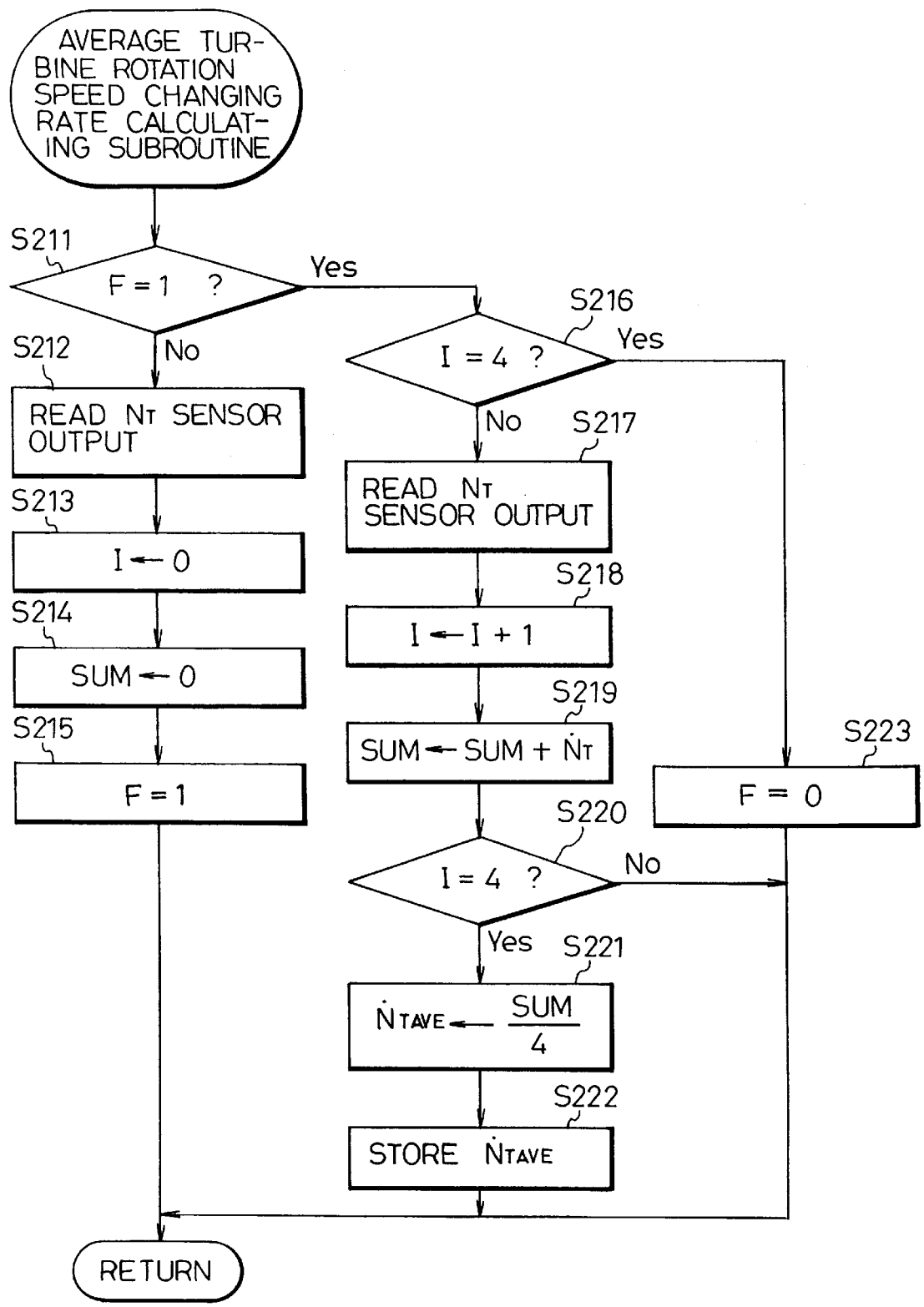
FIG. 18 is a flowchart showing in detail a subroutine, shown in FIG. 17, for the calculation of an average changing rate of the turbine rotation speed.

In the next step S203, the average value $N_{TAVE}$ of turbine rotation speed changing rates is determined. Therefore, an average turbine rotation speed change rate calculating subroutine shown in FIG. 18 is executed at predetermined intervals (for example, 16 ms).

In this subroutine, it is first determined whether or not the value of the flag F is "1" which indicates that the average turbine rotation speed changing rate $N_{TAVE}$ is being calculated (step S211). If the result of this determination is "NO", the output of the $N_T$ sensor 8, which represents the turbine rotation speed $N_T$, is read and stored in the RAM (step S212). Next, the counter value I representing the number of calculations of the average turbine rotation speed changing rate $N_{TAVE}$ and the sum SUM of the turbine rotation speed changing rates $N_T$ are reset to "0" (steps S213 and S214). Further, the value of the flag F is set to "1" (step S215), and the subroutine in the present cycle is completed.

In the next subroutine execution cycle, the result of the determination in step S211 is "YES", and the control flow proceeds to step S216, where it is determined whether or not the counter value I is equal to "4", that is, whether or not a predetermined time Δ T elapses from the time when 4'th shift position is established. In the second subroutine execution cycle, the result of the determination in step S216 is "NO", and the output of the $N_T$ sensor is read and stored in the RAM (step S217). Next, by the ECU 6, which serves as counting means, the counter value is increased by "1" (step S218).

In the next step S219, the turbine rotation speed changing rate $N_T$ is calculated based on the turbine rotation speed $N_T$ detected in step S212 in the preceding cycle, the turbine rotation speed $N_T$ detected in the step S217 in the present cycle, and the subroutine execution period. The calculated turbine rotation speed changing rate $N_T$ is added to the present total sum SUM of the turbine rotation speed changing rates. Next, it is again determined whether or not the counter value I is equal to "4" (step S220). If the result of this determination is "NO", the execution of the subroutine in the present cycle is completed.

In the next subroutine execution cycle, the control flow proceeds to the step S219 through steps S211, S216 and S218, where the sum SUM of the turbine rotation speed changing rates is updated.

Subsequently, the sum SUM of the turbine rotation speed changing rates is updated in the same way. If it is concluded in the next step S220 that the count value I is equal to "4", the ECU 6, which serves as average value calculating means, calculates the average turbine rotation speed changing rate $N_{TAVE}$ by dividing the sum SUM by a value "4" (step S221), and writes the calculated value $N_{TAVE}$ in the RAM (step S222). Whereupon, the execution of the subroutine in the present cycle is completed.

In the next subroutine execution cycle, the control flow proceeds to step S216 through step S211, where it is concluded that the count value I is equal to "4". Then, the control flow proceeds to step S223, where the flag F is reset to "0". Thus, the execution of this subroutine is completed, and the control flow proceeds to step S204 of the main routine shown in FIG. 17.

In step S204, a determination is made as to whether or not the average turbine rotation speed changing rate $N_{TAVE}$ is equal to or greater than the target upper limit value $N_{TA}$. If the result of this determination is "NO", the control flow proceeds to step S205, where it is further determined whether or not the average turbine rotation speed changing rate $N_{TAVE}$ is equal to or smaller than the target lower limit value $N_{TB}$. If the result of the determination in the step S205 is "NO", it is judged that the value of the initial duty ratio $D_H$, set at the present, is between the target upper limit value $N_{TA}$ and the target lower limit value $N_{TB}$, and therefore, that the hydraulic pressure supplied to the second brake 23 is within a proper range. Thereupon, the learning correction subroutine shown in FIG. 17 is completed without making the learning correction of the initial duty ratio $D_H$.

On the other hand, if it is concluded in step S204 that the average turbine rotation speed changing rate $N_{TAVE}$ is equal to or greater than the target upper limit value $N_{TA}$, it is judged that the initial duty ratio $D_H$ is too small. In this case, the control flow proceeds to the step S206, where a learning correction amount $\Delta D_{HL}$ (for example, 1.2%) is added to the learned value $D_{HLi}$ set at the present. Next, the learned value $D_{HLi}$ thus increased is stored in the RAM (step S207). Whereupon, the learning correction routine shown in FIG. 17 is completed.

Inversely, if it is concluded in the step S205 that the average turbine rotation speed changing rate $N_{TAVE}$ is equal to or smaller than the target lower limit value $N_{TB}$, it is judged that the initial duty ratio $D_H$ is too large. In this case, the control flow proceeds to the step S208, where a learning correction amount $\Delta D_{HL}$ is deducted from the learned value $D_{HLi}$ set at the present. Next, the learned value $D_{HLi}$ thus decreased is stored in the RAM (step S207). Whereupon, the learning correction routine shown in FIG. 17 is completed.

This learned value $D_{HLi}$ is added to a reference initial duty ratio $D_{HO}$, which has been set beforehand in the ECU 6, and the resultant value is used as the initial duty ratio $D_H$ in the next 5–3 shift process.

When the learning correction of the initial duty ratio $D_H$ is made each time 5–3 shift is carried out as described above, the average turbine rotation speed changing rate $N_{TAVE}$ converges to a value between the target upper limit value $N_{TA}$ and the target lower limit value $N_{TB}$, and the initial duty ratio $D_H$ is made proper. Thereupon, even when variations in manufacture or deterioration with elapse of time occurs on the automatic transmission 2, a smooth 5–3 shift is carried out. In this case, as shown in FIG. 16, the turbine rotation speed $N_T$ increases continuously with a proper average turbine rotation speed changing ratio.

The shift control apparatus according to the present invention is not limited to the above embodiment, and various modifications can be made.

For example, in the above embodiment, this invention is applied to a down-shift from the fifth shift position to the third shift position, but this invention can be applied to other skip down-shift, for example, from the fourth shift position to the second shift position or from the sixth shift position to the fourth shift position depending on the structure of the automatic transmission 2.

Also, in this embodiment, the learned value $D_{HLi}$ of the duty ratio is set for each turbine rotation speed region, but the duty ratio learned value $D_{HLi}$ can be set for each turbine torque region. In this case, for example, by the ECU 6, which serves as input shaft torque detecting means, the torque converter speed ratio e is calculated from the engine rotation speed $N_E$, transmission output shaft rotation speed $N_O$, and the present gear ratio as with the case explained relating to the step S121 in FIG. 5, and further the turbine torque is determined from the calculated torque converter speed ratio e.

We claim:

1. A shift control method for an automotive automatic transmission having a first transmission mechanism connected to an input shaft of the automatic transmission and a second transmission mechanism connected to the first transmission mechanism in series with respect to the first transmission mechanism in a power transmission system, each of said first and second transmission mechanisms being constructed to selectively establish plural gear positions, and said automatic transmission being constructed to selectively establish first and second shift positions by a combination of a gear position established in the first transmission mechanism and a gear position established in the second transmission mechanism, comprising:

starting a shift change operation for establishing a gear position, corresponding to the second shift position, in the second transmission mechanism in response to a shift command instructing a shift from the first shift position to the second shift position;

starting a shift change operation for establishing a gear position, corresponding to the second shift position, in the first transmission mechanism before the shift change operation in the second transmission mechanism is completed;

detecting a rotation speed of the input shaft of the automatic transmission; and learning-correcting a value of a parameter governing start of shift change in the first transmission mechanism based on rotation speed information, wherein said rotation speed information consists of a changing rate of the detected input shaft rotation.

2. A shift control method for an automotive automatic transmission according to claim 1, wherein said step of learning-correcting the value of the parameter includes learning-correcting the value of the parameter based on a changing rate of the rotation speed of the input shaft observed during a time period from a time the shift change operation in the second transmission mechanism is completed to a time a predetermined period of time has elapsed since start of the shift change operation in the first transmission mechanism.

3. A shift control method for an automotive automatic transmission according to claim 1, wherein the parameter is an engagement force of a friction element in the first transmission mechanism which is released when establishing the second shift position, and said step of starting the shift change operation in the first transmission mechanism includes decreasing the engagement force of the friction element.

4. A shift control method for an automotive automatic transmission according to claim 3, wherein said step of starting the shift change operation in the first transmission mechanism includes decreasing the engagement force of the friction element to a preset value, and said step of learning-correcting the value of the parameter includes learning-correcting said preset value based on the changing rate of the detected rotation speed of the input shaft.

5. A shift control method for an automotive automatic transmission according to claim 1, wherein a speed ratio of the first shift position is smaller than a speed ratio of the second shift position.

6. A shift control method for an automotive automatic transmission according to claim 5, wherein said automatic transmission is constructed to selectively establish a third shift position, a speed ratio of the third shift position being greater that the first shift position and smaller than the second shift position.

7. A shift control method for an automotive automatic transmission having a main transmission mechanism and a subsidiary transmission mechanism which are arranged in series with each other in a power transmission system and each of which is constructed to selectively establish plural gear positions, said automatic transmission being constructed to selectively establish the first and second shift positions by a combination of a gear position established in the main transmission mechanism and a gear position established in the subsidiary transmission mechanism, comprising:

starting a shift change operation for establishing a gear position, corresponding to the second shift position, in either one of the main and subsidiary transmission mechanisms in response to a shift command instructing a shift from the first shift position to the second shift position;

starting a shift change operation for establishing a gear position, corresponding to the second shift position, in the other transmission mechanism before the shift change operation in said one of the transmission mechanisms is completed;

detecting an input shaft rotation speed of the automatic transmission; and learning-correcting a value of a parameter governing start of shift change in said other transmission mechanism based on a changing rate of the input shaft rotation speed, wherein said step of learning-correcting the value of the parameter includes the step of determining an average value of changing rates of the input shaft rotation speed and learning-correcting the value of the parameter based on the determined average value.

8. A shift control method for an automotive automatic transmission having a main transmission mechanism and a subsidiary transmission mechanism which are arranged in series with each other in a power transmission system and each of which is constructed to selectively establish plural gear positions, said automatic transmission being constructed to selectively establish the first and second shift positions by a combination of a gear position established in the main transmission mechanism and a gear position established in the subsidiary transmission mechanism, comprising:

starting a shift change operation for establishing a gear position, corresponding to the second shift position, in either one of the main and subsidiary transmission mechanisms in response to a shift command instructing a shift from the first shift position to the second shift position;

starting a shift change operation for establishing a gear position, corresponding to the second shift position, in the other transmission mechanism before the shift change operation in said one of the transmission mechanisms is completed;

detecting an input shaft rotation speed of the automatic transmission;

detecting torque of the input shaft; and learning-correcting a value of a parameter governing start of shift change in said other transmission mechanism based on a changing rate of the input shaft rotation speed, wherein said step of learning-correcting the value of the parameter includes learning-correcting the value of the parameter for each of those regions which are divided in accordance with the detected input shaft rotation speed or the detected torque of the input shaft.

9. A shift control method for an automotive automatic transmission according to claim 8, wherein said torque detecting step includes the step of detecting said torque of the input shaft based on a torque converter speed ratio.

* * * * *